United States Patent
Po' et al.

[11] Patent Number: 5,252,282
[45] Date of Patent: Oct. 12, 1993

[54] POLYESTERS WITH LOW CRYSTALLIZATION SPEED AND PROCESS FOR PRODUCING THEM

[76] Inventors: Riccardo Po', Via Rosmini 20; Ernesto Occhiello, Corso Cavallotti 13; Fabio Garbassi, Via C. Porta 6, all of Novara, Italy

[21] Appl. No.: 915,349

[22] Filed: Jul. 15, 1992

[30] Foreign Application Priority Data

Jul. 18, 1991 [IT] Italy .................. MI91 A/001990

[51] Int. Cl.$^5$ .............................................. B29C 47/00
[52] U.S. Cl. .................... 264/177.13; 528/272; 528/296; 528/298; 528/299; 528/302; 528/308; 528/308.6; 525/437; 525/444; 428/34.1; 428/364; 264/176.1; 264/239
[58] Field of Search ............ 528/272, 296, 298, 299, 528/302, 308, 308.6; 525/437, 444; 428/34.1, 364; 264/176.1, 177.13, 239

[56] References Cited

FOREIGN PATENT DOCUMENTS 202631 5/1986 European Pat. Off. .
0465040 1/1992 European Pat. Off. .

OTHER PUBLICATIONS

Pracella et al., Blends of Poly(tetramethylene terephthalate) With a Liquid-Crystalline Polyester, Poly(-decamethylene 4,4'-terephthaloyldioxydibenzoate), Crystallization Kinetics and Melting Behaviour, vol. 190, No. Jan. 1989.
Bilibin et al., Synthesis of Regular Polyesters From Aromatic Dicarboxyic Acids and Phenols or Aliphatic Diols, and Study of Their Mesomorphic Properties, Thermotropic Polyesters, 2, vol. 186, No. 8 (Aug. 1985).
Erika Hempel et al., Mol. Cryst. Liq. Cryst., 1990, vol. 193, From Conventional To Liquid Crystalline Polyesters, pp. 199-204.
Chemical Abstracts, vol. 99, N.218533, 1983, vol. 97, N.72969, 1982.
Comprehensive Polymer Science, G. C. Eastwood, Oxford 1989, vol. 5, p. 275.

Primary Examiner—Samuel A. Acquah

[57] ABSTRACT

Low-crystallization-speed polyesters obtained by means of the polycondensation of terephthalic acid with at least one ($C_2$–$C_{10}$)-(Cyclo)alkylene glycol in the presence of 2-50 mol % of a copolymerizable reactant of general formula:

$$\text{ROOC-Ar-OOC-Ar'-COO-Ar-COOR} \quad (I)$$

wherein Ar and Ar' stand for aromatic radicals, and R stands for a hydrogen atom or a ($C_1$–$C_4$)-alkyl radical, or the OR group is replaced by a halogen.

17 Claims, 1 Drawing Sheet

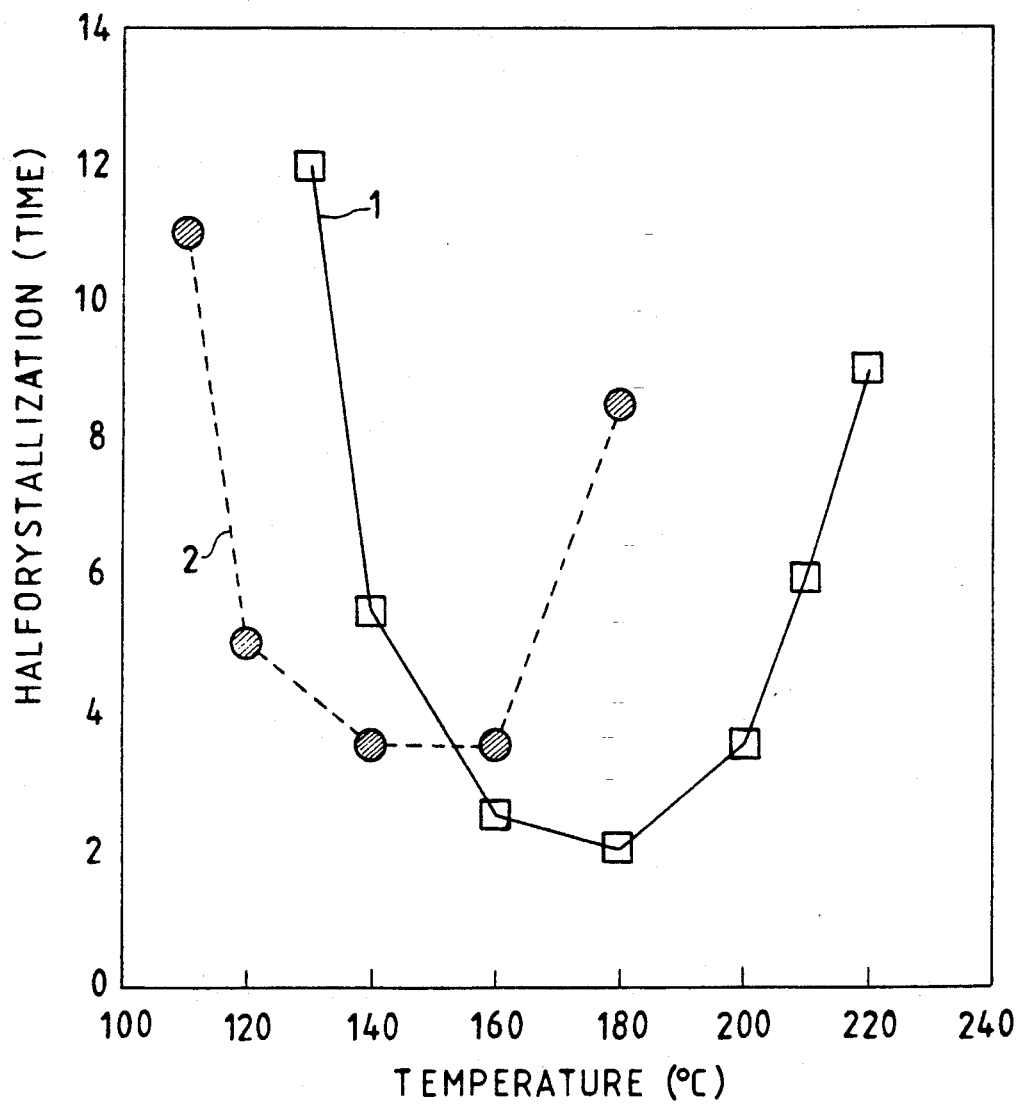

POLYESTERS WITH LOW CRYSTALLIZATION SPEED AND PROCESS FOR PRODUCING THEM

The present invention relates to polyesters with low crystallization speed, and to the process for preparing them.

More particularly, the present invention relates to polyesters of terephtalic acid, which display a low crystalization speed, to the process for preparing them, and to their use in the preparation of shaped bodies obtained by means of the usual techniques of transformation of thermoplastic polymers.

It is well-known that polyester resins, such as poly-(ethylene terephthalate) (PET) display attractive physical and chemical characteristics which make them particularly suitable for preparing fibres, films, hollow containers, moulded articles, and so forth.

It is well-known as well that the crystallization behaviour of these resins has a strong influence on many of the above applications, and displays obvious drawbacks.

For example, when fibres suitable for high-speed spinning processes are manufactured, having available polyesters which crystallize very slowly (generally, at a lower speed than non-modified resin) is important, because, on the contrary, a frequent breaking of the fibres would be experienced, with consequent undesired discontinuances of production cycle.

In technical literature, polyesters modified with co-monomers which reduce their crystallization speed were proposed, which are suitable for use in fibre production.

For example, in European patent application published under No. 202,631, PET types with a reduced crystallization speed are disclosed, which are modified with amounts comprised within the range of from 1 to 50% by weight of such monomers as dimethyl 2,6-naphthalene dicarboxylate, p-hydroxy benzoic acid, 4,4'-biphenylene dicarboxylic acid or trimellitic acid. Also in the injection-moulding of the parisons for PET bottles production, it is important that the crystallization of the sprue is minimized in the point in which said sprue is connected with the parison, in that in this way the impact strength of the finished article is improved. For that purpose, long heating times and higher processing temperatures are adopted in the blowing cycle, with self-explanatory disadvantages as regards the productivity on one hand, and energy requirements on the other hand.

The present Applicant has found now that terephthalic acid polyester resins with low crystallization speed—and therefore particularly suitable for manufacturing those finished articles, such as fibres and bottles, for which a high crystallization speed is an undesired property—can be obtained by using in the polymerization mixture particular comonomers of essentially aromatic character. In the resulting polymers, the properties of the equivalent resins in their non-modified state are retained unchanged, and an increase in glass transition temperature and a decrease of melting temperature, as compared to the non-modified polymer, can be observed.

A decrease in polymer melting temperature results in smaller amounts of heat having to be supplied to the material, and consequently in the possibility of achieving considerable energy savings. A further advantage derives from the lower rate of development of aldehydes during the processing step—which development rate is known to be the higher, the higher the temperature to which the polymer is submitted.

Furthermore, if the crystallization speed is low enough, blanks can be easily obtained in bottle manufacturing sector, which have a higher thickness, without said parisons crystallizing and turning into opaque.

Therefore, an object of the present invention are the low-crystallization-speed polyesters obtained by means of the polycondensation of at least one ($C_2$–$C_{10}$)-alkylene or -cycloalkylene glycol with a mixture constituted by terephthalic acid, or a derivative thereof, optionally substituted with halogens, such as chlorine, or ($C_1$–$C_4$)-alkyl radicals and 2-50 mol %, relatively to total mols, of a copolymerizable reactant having the general formula:

$$ROOC-Ar-OOC-Ar'-COO-Ar-COOR \qquad (I)$$ 

wherein

Ar and Ar' which may be the same, or different from each other, represent aromatic radicals of from 6 to 20 carbon atoms, and R represents a hydrogen atom or a ($C_1$–$C_4$)-alkyl radical, or the OR group is replaced by a halogen.

Preferred polyesters according to the present invention are those obtained in the presence of 3–8 mol % of the reactant having the general formula (I).

Preferred reactants having the general formula (I) are those in which R represents a hydrogen atom, or a methyl or ethyl radical and in which Ar' and Ar are selected from benzene radicals or naphthalene radicals, in particular naphthalene radicals with reactive functions in (1,3)-, (1,6)-, (2,3)- (2,6)- or (2,7)-positions.

Particularly suitable alkylene glycols for use in the instant invention are ethylene glycol, tetramethylene glycol and cyclohexane-dimethanol.

The compounds having the general formula (I) are known products, and their preparation is described in chemical literature, in particular in the papers reported by Chemical Abstracts Vol. 99, N.218533, 1983; and Vol. 97, N.72969, 1982.

In these papers, said compounds are synthetized by means of the condensation of an aroyl dichloride $$ClOC-Ar'-COCl$$ 

with an aromatic acid (or a corresponding aliphatic ester) bearing a substituent hydroxy group on one of its aromatic ring positions, in aliphatic of aromatic hydrocarbon solvents, chlorinated solvents or ethereal solvents, and in the presence of bases as HCl acceptors.

The synthesis of these compounds can also be carried out by interfacial way, using a double phase system constituted by water and a water-immiscible organic solvent.

The low-crystallization-speed polyesters according to the present invention have an inherent viscosity, as measured in phenol/tetrachloroethane (in the ratio of 60/40 by weight) at 30° C. and at the concentration of 0.25 g/dl, higher than 0.5 dl/g, generally comprised within the range of from 0.6 to 1.5 dl/g, a crystallization temperature lower than 180° C., generally comprised within the range of from 140° to 170° C., and a glass transition temperature (Tg) higher than 75° C. Said polyesters are suitable for use in order to obtain shaped bodies which can be manufactured by means of common technologies for thermoplastic polymers fabrication such as, e.g., injection-moulding or extrusion; they can be transformed into films or fibres, can be used as matrix phases for composite materials based on fibres or inorganic fillers, and can be used as mixtures with other polymers, or with common additives known in the art of plastics processing. A process for preparing the low-crystallization-speed polyesters according to the present invention comprises causing at least one ($C_2$–$C_{10}$)-alkylene or -cycloalkylene glycol to react with a mixture constituted by optionally substituted terephthalic acid, or a derivative thereof, such a ($C_1$–$C_4$)-alkyl ester, an acyl halide or an acid anhydride, and 2-50 mol %, relatively to total mols, of a copolymerizable reactant having the general formula:

ROOC-Ar-OOC-Ar'-COO-Ar-COOR wherein Ar, Ar' and R have the same meanings as indicated hereinabove.

More particularly, the process according to the present invention can be accomplished in accordance with as described in "Comprehensive Polymer Science", G. C. Eastmond, A. Ledwith, S. Russo, P. Singwalt Eds., Pergamon Press, Oxford 1989, Vol. 5, page 275.

In a typical synthesis procedure starting from the diester of the dicarboxy acid, the reaction mixture is purged, is charged under an inert atmosphere (nitrogen) and is heated to 180° C., temperature at which the alcohol formed during the reaction of alcoholysis distils off. The temperature is then gradually increased up to 280°-290° C., and the pressure is decreased down to 0.1-0.2 Torr, so as to favour the polycondensation.

The reactions occurring during the above synthesis routes are catalysed by compounds of acidic character, such as protic acids, such as $H_2SO_4$, p-toluenesulfonic acid, and so forth, or Lewis' acids, such as zinc, manganese, cobalt, magnesium acetate, and so forth. During the polycondensation step, the use of acidic oxides, such as antimony or germanium oxide, or of transition metal alkoxides, such as titanium tetra(isopropoxide), results to be advantageous.

The importance of the instant finding cannot go unnoticed by those skilled in the art. The possibility of being endowed with a lower crystallization speed renders these polyesters attractive for application in the sector of high-speed fibre spinning and in the sector of parison moulding for bottle manufacturing. Furthermore, thanks to the lower melting temperature of these compounds, the development of aldehydes during the processing thereof can be considerably decreased, and, finally, the increase in their glass transition temperature may enable said materials to be better compatible with typical technologies customary in packaging industry, such as high-temperature filling and pasteurization.

In the following some examples are reported for merely illustrative purposes, and in no way the following examples should be construed as being limitative of the same invention.

EXAMPLE 1

This example discloses the preparation of a polyester from ethylene glycol, dimethyl terephthalate and dimethyl 4,4'-(terephthaloyl dioxy)dibenzoate. 93.1 g(0.48 mol) of dimethyl terephthalate, 8.68 g(0.02 mol) of dimethyl 4,4'-(terephthaloyl-dioxy)-dibenzoate, 68.2 g(1.1 mol) of ethylene glycol and 100 mg of manganese acetate tetrahydrate were charged to a glass flask of 250 ml of capacity. The reaction mixture was heated up to 180° C. and was kept at that temperature during an approximately 90-minute time, in order to cause methanol to distil off, then the temperature was increased up to 240° C. and 45 mg of antimony trioxide and 300 mg of 3,5-di-tert.-butyl-4-hydroxy anisole were added. The pressure was then gradually decreased down to 0.1 Torr, and the temperature was increased up to 290° C.; the reaction mass was kept about 30 minutes under these conditions. Throughout this time period, the excess of ethylene glycol was removed.

After bringing the system back to room temperature and at atmospheric pressure with $N_2$, the resulting polymer, recovered and crushed, had an intrinsic viscosity of 0.72 dl/g, as measured in phenol/tetrachloroethane mixture (in the ratio of 60/40 by weight) at 30° C. and at the concentration of 0.25 g/dl. The glass transition temperature (Tg) and the melting temperature (Tm) were determined by differential scanning calorimetry (DSC). In this particular case, values of Tg and Tm respectively of 81° C. and 238° C. were obtained.

EXAMPLE 2

The procedure of Example 1 was repeated, save that dimethyl 4,4'-(isophthaloyl dioxy) dibenzoate was used. 93.1 g(0.48 mol) of dimethyl terephthalate, 8.68 g (0.02 mol) of dimethyl 4,4'-(isophthaloyl dioxy) dibenzoate, 68.2 g(1.1 mol) of ethylene glycol were polymerized in the presence of 100 mg of maganese acetate tetrahydrate. At the temperature of 240° C., 45 mg of antimony trioxide and 300 mg of 3,5-di-tert.-butyl-4-hydroxyanisole were added. The resulting polymer had an intrinsic viscosity of 0.70 dl/g, a Tg of 78° C. and a Tm of 228° C.

EXAMPLE 3

The procedure of Example 1 was repeated, save that dimethyl 4,4'-(phthaloyl dioxy) dibenzoate was used. 93.1 g(0.48 mol) of dimethyl terephthalate, 8.68 g (0.02 mol) of dimethyl 4,4'-(phthaloyl-dioxy)-dibenzoate, 68.2 g(1.1 mol) of ethylene glycol were polymerized in the presence of 100 mg of manganese acetate tetrahydrate. At the temperature of 240° C., 45 mg of antimony trioxide and 300 mg of 3,5-di-tert-butyl-4-hydroxy anisole were added. The resulting polymer had an intrinsic viscosity of 0.65 dl/g, a Tg of 79° C. and a Tm of 234° C.

EXAMPLE 4

The procedure of Example 1 was repeated, save that dimethyl 6,6'-(isophthaloyl dioxy) di-2,2'-naphthoate was used.

93.1 g(0.48 mol) of dimethyl terephthalate, 10.68 g(0.02 mol) of dimethyl 6,6'-(isophthaloyl-dioxy)-di-2,2'-naphthoate, 68.2 g(1.1 mol) of ethylene glycol were polymerized in the presence of 87 mg of magnesium acetate tetrahydrate and 34 mg of cobalt acetate tetrahydrate. At the temperature of 250° C., 45 mg of antimony trioxide and 300 mg of 3,5-di-tert.-butyl-4-hydroxy anisole were added. The resulting polymer had an intrinsic viscosity of 0.55 dl/g, a Tg of 81° C. and a Tm of 232° C.

COMPARATIVE EXAMPLE 1

The procedure of Example 1 was repeated in order to synthetize a poly(ethylene terephthalate) to be used as control. 120.0 g(0.62 mol) of dimethyl terephthalate, 80.6 g(1.30 mol) of ethylene glycol were polymerized in the presence of 312 mg of zinc acetate dihydrate and 58 mg of antimony trioxide. The resulting polymer had an intrinsic viscosity of 0.66 dl/g, a Tg of 77° C. and a Tm of 249° C.

EXAMPLE 5

The propensity of (co)polyesters of Examples 1-4 and Comparative Example 1 to crystallize was evaluated by locating the temperature corresponding to the minimum of the exothermic crystallization peak, Tc. Such a temperature was identified by DSC, heating the sample up to a higher temperature than the sample melting temperature, and then performing a downwards temperature scanning. The lower said Tc temperature, the lower the crystallization speed. In Table 1 the Tc values obtained in that way are reported. It can be observed that the Tc values shown by the copolyesters according to the invention are meaningfully lower than of control PET.

TABLE 1

| Example | Tc (°C.) |
|---|---|
| 1 | 151 |
| 2 | 170 |
| 3 | 156 |
| 4 | 162 |
| Comparative Example 1 | 183 |

EXAMPLE 6

Measurements of crystallization kinetics were carried out on PET polymer of Comparative Example 1, and on one of polyesters according to the invention, namely, of Example 2. Said measurements were carried out by DSC, according to the following procedure:

the sample was heated to 280° C. and was kept in the molten state for 2 minutes, in order to destroy any crystalline centres;

the temperature of the sample was rapidly decreased to the interesting temperature (temperature decreasing rate 150° C./minute);

with temperature being kept constant, the trend of heat exchange was monitored as a function of time;

as the "half-crystallization time", the time was assumed which corresponds to reaching an area which is the half of the typical area of exothermic crystallization peak.

In FIG. 1, the half-crystallization times are reported for control PET (line 1) and, respectively, for the polyester according to the present invention, the synthesis of which is reported in Example 2 (line 2). In the latter case, a shorter half-crystallization time is observed, accompanied by a shift of the line towards lower temperatures, with corresponding advantages during the moulding step.

We claim:

1. Low-crystallization-speed polyesters obtained by means of the polycondensation of at least one ($C_2$-$C_{10}$)-alkylene or -cycloalkylene glycol with a mixture constituted by terephthalic acid, or a derivative thereof, and 2-50 mol %, relatively to total mols, of a reactant having the general formula:

ROOC-Ar-OOC-Ar'-COO-Ar-COOR  (I)

wherein
Ar and Ar' which may be the same, or different from each other, represent aromatic radicals of from 6 to 20 carbon atoms, and R represents a hydrogen atom or a ($C_1$-$C_4$)-alkyl radical, or the OR group is replaced by a halogen.

2. Polyesters according to claim 1, obtained in the presence of 3-8 mol % of reactant having the general formula (I).

3. Polyesters according to claim 1, in which the reactants having the general formula (I) are those in which R represents a hydrogen atom, or a methyl or ethyl radical and in which Ar' and Ar are selected from benzene radicals or naphthalene radicals, 4. Polyesters according to claim 1, in which said glycols are selected from ethylene glycol, tetramethylene glycol and cyclohexane-dimethanol.

5. Low-crystallization-speed polyesters according to claim 1, having an intrinsic viscosity, as measured in phenol/tetrachloroethane (in the ratio of 60/40 by weight) at 30° C. and at the concentration of 0.25 g/dl, higher than 0.5 dl/g, a crystallization temperature lower than 180° C., and a glass transition temperature (Tg) higher than 75° C.

6. Process for preparing the low-crystallization-speed polyesters according to claim 1, which comprises reacting at least one ($C_2$-$C_{10}$)-alkylene or -cycloalkylene glycol to with a mixture constituted by optionally substituted terephthalic acid, or a derivative thereof, and 2-50 ml %, relatively to total mols, of a reactant having the general formula:

ROOC-Ar-OOC-Ar'-COO-Ar-COOR wherein Ar, Ar' and R have the meanings as indicated in claim 1.

7. Low-crystallization-speed polyesters according to claim 1 wherein the terephthalic acid or a derivative thereof is substituted with halogen.

8. Low-crystallization-speed polyesters according to claim 7 wherein the halogen is chlorine.

9. Low-crystallization-speed polyesters according to claim 1 wherein the terephthalic acid or derivative thereof is substituted with ($C_1$-$C_4$)-alkyl radicals.

10. Low-crystallization-speed polyesters according to claim 4, wherein the naphthalene radical contains reactive functions in a position selected from the group of (1,3)-, (1,6)-, (2,3)-, (2,6)-, and (2,7)-positions.

11. Low-crystallization-speed polyesters according to claim 5 having an intrinsic viscosity within the range of from 0.6 to 1.5 dl/g.

12. Low-crystallization-speed polyesters according to claim 5 having a crystallization temperature within the range of from 140° to 170° C.

13. A process for preparing low-crystallization-speed polyesters according to claim 6 wherein the terephthalic acid or derivative thereof is substituted with halogen or ($C_1$-$C_4$)-alkyl radicals.

14. A process for preparing low-crystallization-speed polyesters according to claim 13 wherein the halogen is chlorine.

15. A process for preparing low-crystallization-speed polyesters according to claim 6 wherein the derivative of terephthalic acid is selected from the group of esters, acyl halides and acid anhydrides.

16. A process for high-speed fiber spinning, said process comprising using fibres comprised of low-crystallization-speed polyesters according to claim 1.

17. A process for blank molding for bottle manufacturing, said process comprising using blanks comprised of low-crystallization-speed polyesters according to claim 1.

* * * * *